United States Patent
Nishijima et al.

(10) Patent No.: US 9,679,586 B2
(45) Date of Patent: Jun. 13, 2017

(54) MANUFACTURING METHOD OF A WRITE PORTION FOR A THERMAL ASSISTED MAGNETIC HEAD SLIDER

(71) Applicant: SAE Magnetics (H.K.) Ltd., Hong Kong (CN)

(72) Inventors: Natsuo Nishijima, Hong Kong (CN); Dong Sheng Li, GuangDong (CN)

(73) Assignee: SAE MAGNETICS (H.K.) LTD., Hong Kong (CN)

(*) Notice: Subject to any disclaimer, the term of this patent is extended or adjusted under 35 U.S.C. 154(b) by 188 days.

(21) Appl. No.: 14/704,675

(22) Filed: May 5, 2015

(65) Prior Publication Data

US 2015/0235657 A1    Aug. 20, 2015

Related U.S. Application Data

(62) Division of application No. 13/855,953, filed on Apr. 3, 2013, now Pat. No. 9,099,129.

(30) Foreign Application Priority Data

Feb. 22, 2013    (CN) .......................... 2013 1 0057506

(51) Int. Cl.
| | | |
|---|---|---|
| G11B 5/127 | (2006.01) | |
| H04R 31/00 | (2006.01) | |
| G11B 5/00 | (2006.01) | |
| G11B 5/31 | (2006.01) | |
| G11B 5/60 | (2006.01) | |

(52) U.S. Cl.
CPC .............. *G11B 5/127* (2013.01); *G11B 5/314* (2013.01); *G11B 5/3116* (2013.01); *G11B 5/3163* (2013.01); *G11B 5/6088* (2013.01); *G11B 2005/0021* (2013.01); *Y10T 29/49048* (2015.01)

(58) Field of Classification Search
CPC ....... G11B 5/314; G11B 5/112; G11B 5/1278; G11B 5/6088; G11B 2005/0021; G11B 5/3116; G11B 5/3163; G11B 5/31; Y10T 29/49032; Y10T 29/49043; Y10T 29/49044; Y10T 29/49046; Y10T 29/49048
See application file for complete search history.

(56) References Cited

U.S. PATENT DOCUMENTS

| | | | | |
|---|---|---|---|---|
| 7,551,398 | B2 * | 6/2009 | Fujimaki | ................ G11B 5/187 360/235.4 |
| 8,000,178 | B2 | 8/2011 | Shimazawa et al. | |
| 8,036,069 | B1 * | 10/2011 | Jin | ......................... G02B 6/107 360/245.3 |

(Continued)

*Primary Examiner* — Paul D Kim
(74) *Attorney, Agent, or Firm* — Nixon & Vanderhye P.C.

(57) ABSTRACT

A manufacturing method of a write portion for a thermally assisted magnetic head slider includes providing a write portion including a write element, a waveguide, and a plasmon unit; lapping opposed-to-magnetic recording medium surfaces of the write element and the waveguide, and an near-field light generating surface of the plasmon unit; only forming a carbon layer on the opposed-to-magnetic recording medium surface of the write element. Corrosive elements in the write portion can be prevented from being corroded and the write element can be prevented from being worn and abraded not only, stable thermal ability for a plasmon unit can be maintained but also.

4 Claims, 12 Drawing Sheets

(56) References Cited

U.S. PATENT DOCUMENTS

| | | | |
|---|---|---|---|
| 8,493,821 B1* | 7/2013 | Sasaki | G11B 5/1278 369/13.13 |
| 8,588,040 B1* | 11/2013 | Fujita | G11B 5/102 360/59 |
| 8,638,645 B1* | 1/2014 | Nishijima | G11B 5/1272 369/13.13 |
| 8,787,130 B1 | 7/2014 | Yuan et al. | |
| 8,848,495 B1* | 9/2014 | Wu | G11B 5/3133 369/13.33 |
| 2007/0058297 A1* | 3/2007 | Kasamatsu | G11B 21/21 360/235.1 |
| 2010/0103553 A1 | 4/2010 | Shimazawa et al. | |
| 2012/0292287 A1* | 11/2012 | Araki | G11B 5/3116 216/22 |
| 2014/0241139 A1 | 8/2014 | Nishijima et al. | |

\* cited by examiner ic head slider of the present invention includes steps of: providing a write portion including a write element, a waveguide, and a plasmon unit; lapping opposed-to-magnetic recording medium surfaces of the write element and the waveguide, and an near-field light generating surface of the plasmon unit; and only forming a carbon layer on the opposed-to-magnetic recording medium surface of the write element.

MANUFACTURING METHOD OF A WRITE PORTION FOR A THERMAL ASSISTED MAGNETIC HEAD SLIDER

RELATED APPLICATIONS

This application is a divisional of application Ser. No. No. 13/855,953 filed Apr. 3, 2013, which claims priority to Chinese Application No. 201310057506.1 filed Feb. 22, 2013, now U.S. Pat. No. 9,099,129, the entire contents of each of which is hereby incorporated by reference in this application.

FIELD OF THE INVENTION

The present invention relates to a hard disk drive (HDD) and, more particularly, to a write portion, a thermally assisted magnetic recording head slider, a head gimbal assembly (HGA), an HDD with the same, and manufacturing methods thereof.

BACKGROUND OF THE INVENTION

Hard disk drives are common information storage devices. FIG. 1a provides an illustration of a typical disk drive unit 100 essentially consisting of a series of rotatable disks 101 mounted on a spindle motor 102, and a Head Stack Assembly (HSA) 130 which is rotatable about an actuator arm axis 105 for accessing data tracks on disks during seeking. The HSA 130 includes at least one drive arm 104 and a head gimbal assembly (HGA) 150. Typically, a spindling voice-coil motor (VCM) is provided for controlling the motion of the drive arm 104.

Referring to FIG. 1b, the HGA 150 includes a slider having a thermally assisted head 110, and a suspension 190 to load or suspend the slider 103 thereon. The suspension 190 includes a load beam 106, a base plate 108, a hinge 107 and a flexure 109, all of which are assembled together. When the disk drive is on, a spindle motor 102 will rotate the disk 101 at a high speed, and the slider 103 will fly above the disk 101 due to the air pressure drawn by the rotated disk 101. The slider 103 moves across the surface of the disk 101 in the radius direction under the control of the VCM. With a different track, the slider 103 can read data from or write data to the disk 101.

Referring to FIG. 1c, the thermally assisted head slider 103 has a substrate 1031 with an air bearing surface (ABS) 1032 processed so as to provide an appropriate flying height. The thermally assisted magnetic head 110 includes a write portion 121 having a write element 123 and read portion 122 having a read element 124. And a thermal energy source 111 is mounted on the substrate 1031 for providing heat energy to the thermally assisted magnetic head 110, such as a laser diode at or near the location of the write portion 121. Conventionally, the thermal energy source is bonded to the substrate 1031 via solders, for example. This thermal energy source provides energy to a portion of the magnetic recording medium, which reduces the medium's coercivity. After that, writing is performed by applying write magnetic field to the heated portion; therefore the writing operation is facilitated. Generally, the thermally assisted magnetic head 110 further includes a waveguide 125 and a plasmon antenna (PA) or a plasmon generator (PG) 127 located near the write element 123. The waveguide 125 is provided for guiding the laser light to the ABS 1032 by a surface of the PG 127, thereby providing near-field light, instead of directly applying the laser light to an element that generate near-field light. Such a PG and a waveguide are disclosed, for example, in US Patent Publication No 2010/0103553 A1.

Conventionally, for preventing the read portion 122 and the write portion 121 from lacking magnetic or being impacted by the external environment, a over coat made by diamond-like carbon (DLC) for example, is covered on the top of all elements mentioned above to form the ABS 1032. However, such a DLC layer couldn't endure the high temperature during the writing operation for the thermally assisted magnetic head slider 103, which may absorb the near-field light propagated by the PG 127 significantly and even may be disappeared. Thus the DLC layer has been replaced with a coat layer 131 with lower extinction coefficient (light absorption index) of complex refraction index made by SiOx, SiNx, SiOxNy, TaOx, TaNx, TaOxNy, hydrogenated amorphous carbon in the thermally assisted magnetic head slider, to cover on the opposed-to-magnetic medium recording surfaces of all elements mentioned above to form the ABS 1032, so as to obtain a good thermal stability for writing.

However, since the opposed-to-magnetic medium recording surfaces of the write element 123, the waveguide 125 and the read element 124 which are corrosive material are also covered by the coat layer 131 made by oxide material except for the PG 127, thus the corrosive materials such as the write element 123, the waveguide 125 and the read element 124 may be corroded by oxygen due to the coat layer 131 has poorer oxygen barrier ability compared to the DLC layer. Furthermore, the coat layer 131 made by oxide material has a smaller hardness than the DLC layer, which may be worn after frequent contacting the medium when reading or writing, thus is not suitable for using for long.

Accordingly, it is desired to provide improved manufacturing methods of a write portion and a thermally assisted magnetic head slider to overcome the above-mentioned drawbacks.

SUMMARY OF THE INVENTION

One objective of the present invention is to provide a manufacturing method of a write portion for a thermally assisted magnetic head slider, by which corrosive elements in the write portion can be prevented from being worn and abraded, and stable thermal ability of the plasmon unit can be maintained.

Another objective of the present invention is to provide a manufacturing method of a thermally assisted magnetic head slider, by which corrosive elements in the write portion can be prevented from being worn and abraded, and stable thermal ability of the plasmon unit can be maintained.

To achieve above objectives, a manufacturing method of a write portion for a thermally assisted magnetic head slider of the present invention includes steps of: providing a write portion including a write element, a waveguide, and a plasmon unit; lapping opposed-to-magnetic recording medium surfaces of the write element and the waveguide, and an near-field light generating surface of the plasmon unit; and only forming a carbon layer on the opposed-to-magnetic recording medium surface of the write element.

As a preferred embodiment, the method further includes forming a low light absorption layer on the near-field light generating surface of the plasmon unit and the opposed-to-magnetic recording medium surface of the waveguide.

As another embodiment, the method further includes forming a low light absorption layer on the carbon layer.

Preferably, the carbon layer is formed by etching.

A manufacturing method of a thermally assisted magnetic head slider of the present invention includes steps of: providing a wafer with a plurality of thermally assisted magnetic head slider elements each of which has a substrate with an ABS, a read portion including a read element and a write portion including a write element, a waveguide, and a plasmon unit; cutting the wafer into a plurality of row bars; lapping surfaces of the row bars so as to obtain a predetermined requirement; in the write portion, only forming a first carbon layer on an opposed-to-magnetic recording medium surface of the write element; and cutting the row bar into a plurality of individual thermally assisted magnetic head slider.

As an embodiment, the method further includes forming a second carbon layer on an opposed-to-magnetic recording medium surface of the read element.

Preferably, the first carbon layer and the second carbon layer are formed by etching.

Preferably, the etching comprises dry etching and wet etching.

As another embodiment, the method further includes forming a low light absorption layer on the first and second carbon layers, an opposed-to-magnetic recording medium surface of the waveguide, and an near-field light generating surface of the plasmon unit.

In comparison with the prior art, on one hand, the write element of the present invention is protected by the carbon layer from being corroded by oxygen due to the good oxygen barrier ability of the carbon layer; one the other hand, the write element can be protected from being worn or abraded when accident touching or contacting with the medium, thereby keeping its reliability and a long using life. Furthermore, as there is no carbon layer on the plasmon unit and waveguide, thus heat brought by the near-field light may not be absorbed and congregated on the surface during writing operation, so as to keep stable thermal ability for the plasmon unit.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1A:
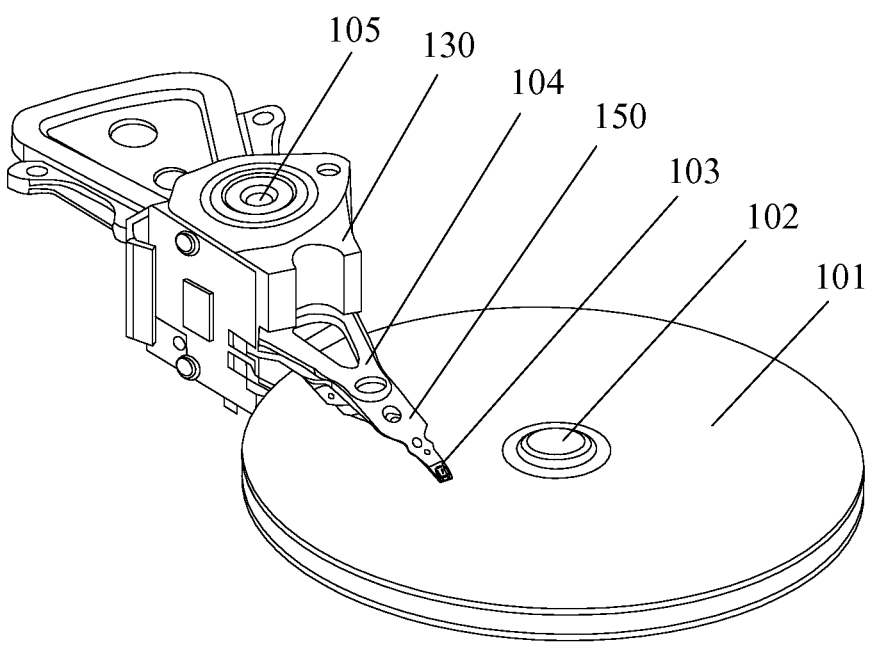
FIG. 1a is a partial perspective view of a conventional HDD.
Figure 1B:
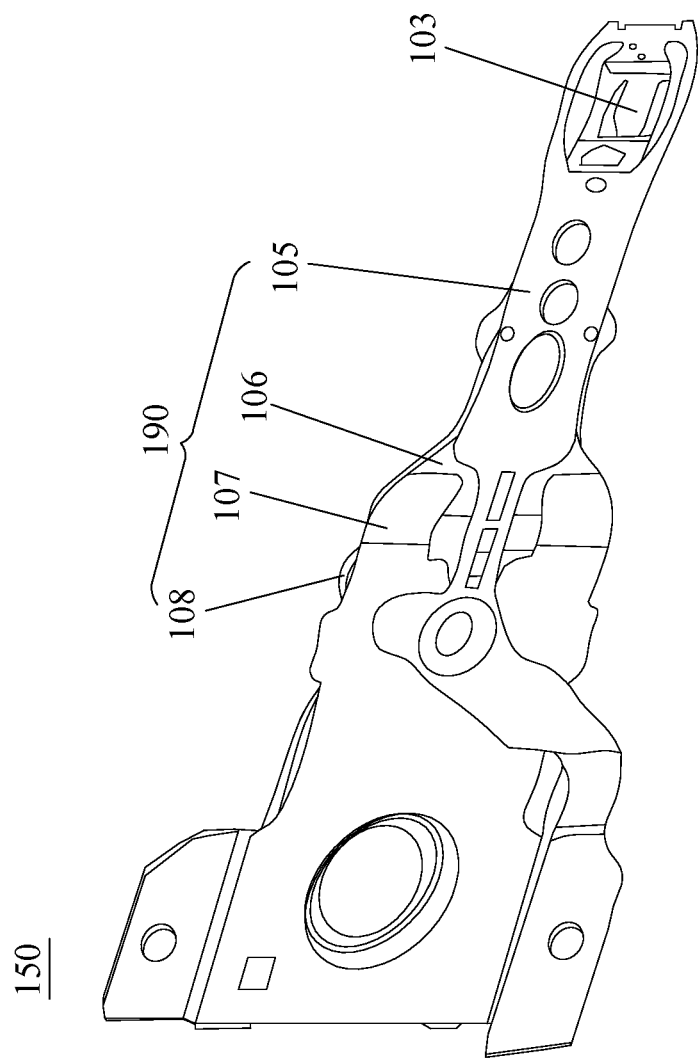
FIG. 1b is a partial top plan view of a conventional HGA.
Figure 1C:
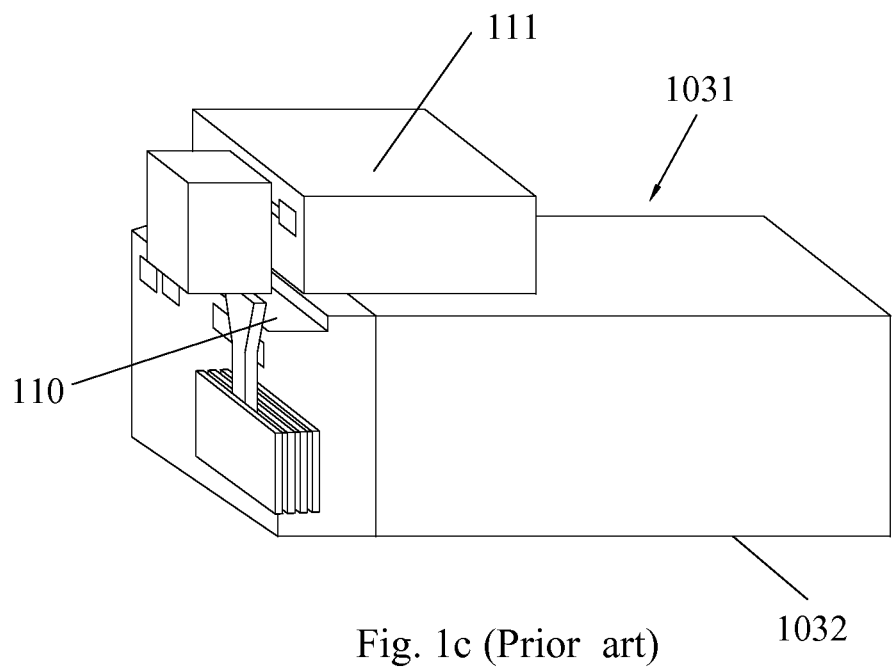
FIG. 1c is a perspective view of a conventional thermally assisted magnetic head slider having a conventional thermally assisted magnetic head.
Figure 1D:
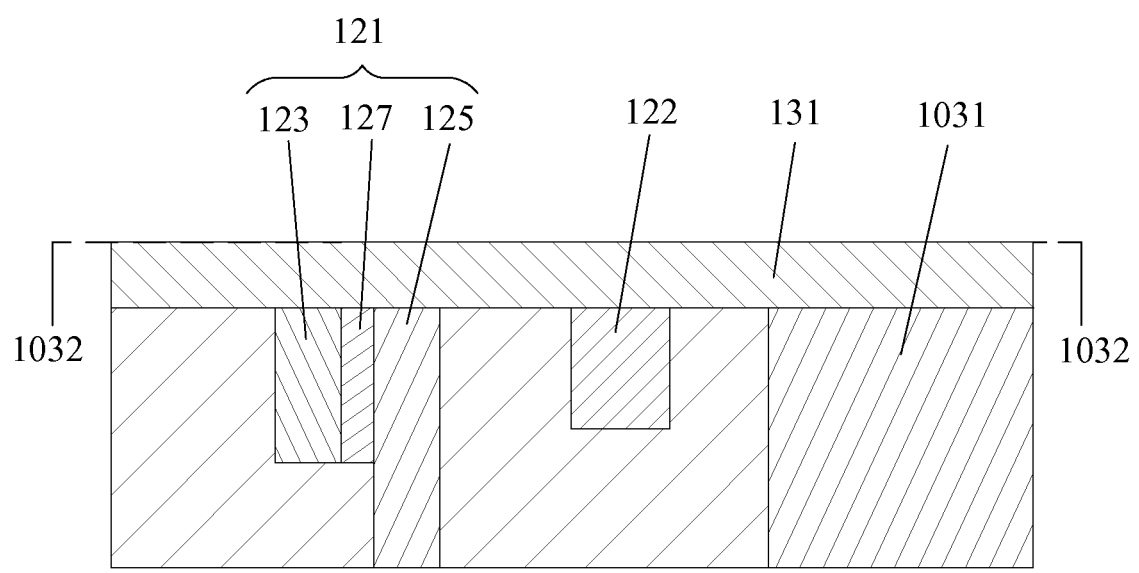
FIG. 1d is a cross-sectional view of a conventional thermally assisted magnetic head slider.

Various preferred embodiments of the invention will now be described with reference to the figures, wherein like reference numerals designate similar parts throughout the various views. As indicated above, the invention is directed to a write portion, a thermally assisted magnetic head, HGA, HDD with the same, and directed to manufacturing methods thereof, thereby preventing corrosive elements in the write portion from being corroded and preventing the write element from being worn and abraded, and keeping stable thermal ability for a plasmon unit.

Figure 2:
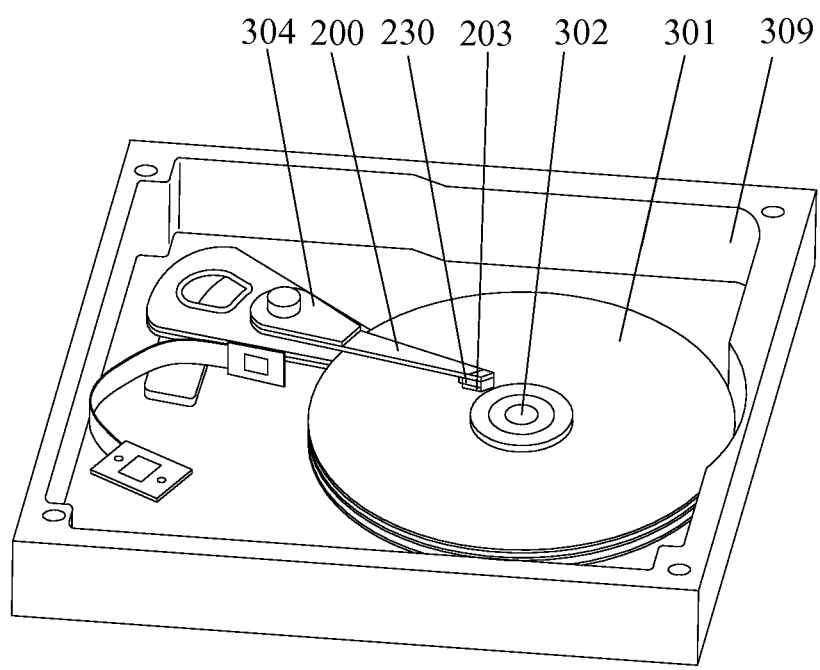
FIG. 2 is a perspective view of an HDD according to an embodiment of the invention.
Figure 3:
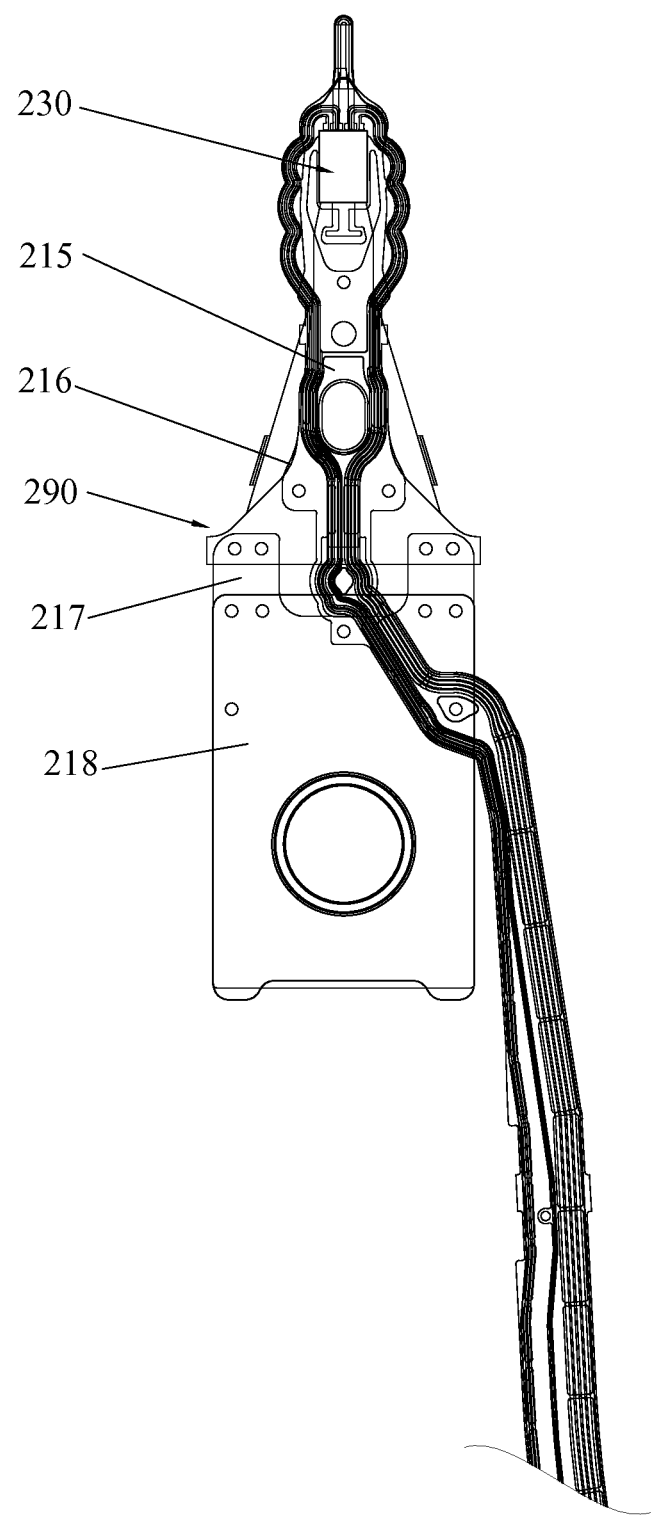
FIG. 3 is a perspective view of the HGA of the hard disk drive shown in FIG. 2.

FIG. 2 is a perspective view of an HDD according to an embodiment of the present invention. The HDD 300 includes several HGAs 200, drive arms 304 stacked and connected to the HGAs 200, a series of rotatable disks 301, and a spindle motor 302 to spin the disk 301, all of which are mounted in a housing 309. The structure of the HDD 300 according to the present invention is not limited to that described above. For example, the number of the rotatable disks 301, HGAs 200 and drive arms 304 may be one. As shown in FIG. 3, each HGA 200 includes a suspension 290 and a thermally assisted magnetic head slider 230 carried on the suspension 290 which has a thermally assisted magnetic head as a thin-film magnetic head for reading from and writing into the rotatable disks 301. The suspension 290 includes a load beam 216, a base plate 218, a hinge 217 and the flexure 215, all of which are assembled with each other. Specifically, the thermally assisted head 230 is carried on the flexure 215.

Figure 4:
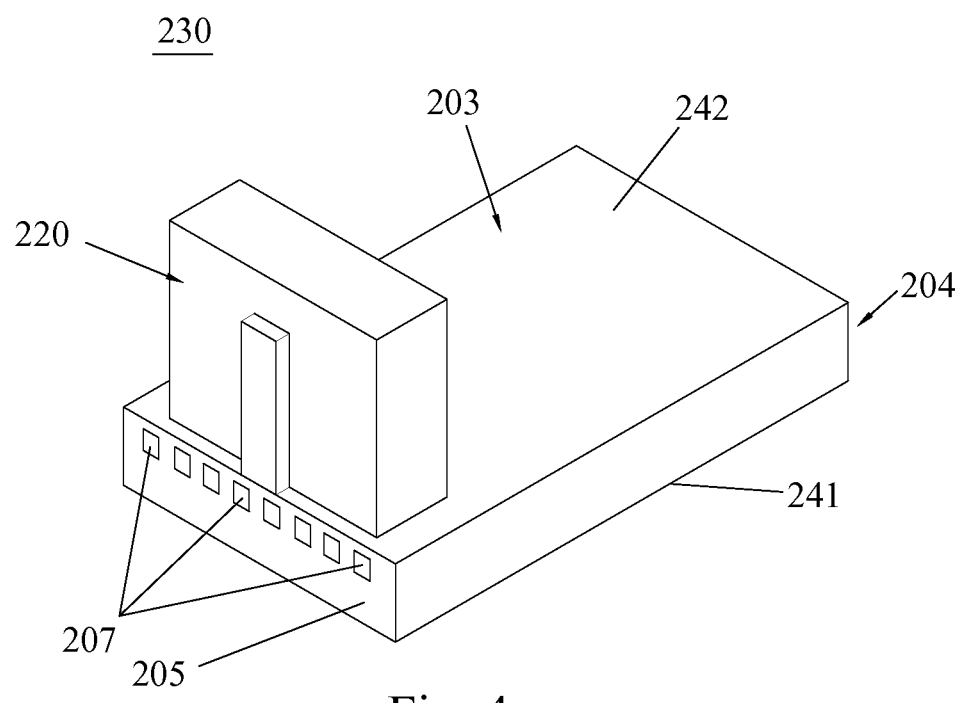
FIG. 4 is a perspective view of a thermally assisted magnetic head slider with a thermally assisted magnetic head according to an embodiment of the present invention.
Figure 5:
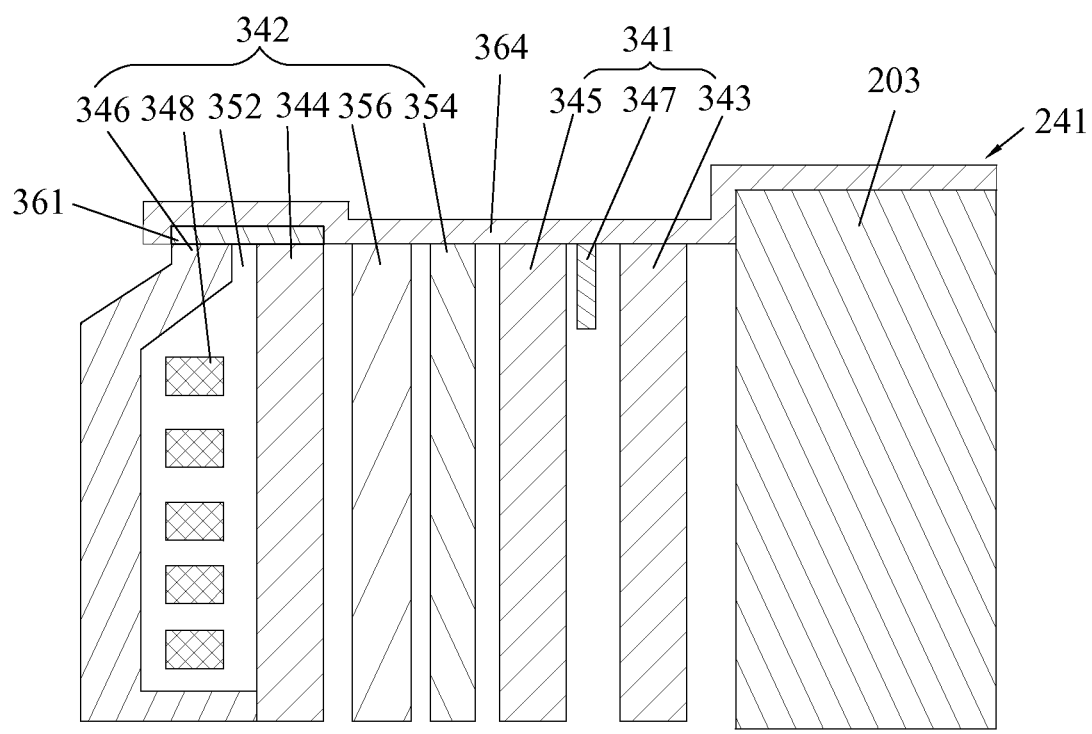
FIG. 5 is a cross-sectional view of the thermally assisted magnetic head slider shown in FIG. 4.

As shown in FIGS. 4-5, the thermally assisted magnetic head slider 230 includes a substrate 203, a thermally assisted magnetic head 340 embedded in the substrate 203 for reading and writing, and a light source module 220 formed on the substrate 203 for thermally assisted magnetic recording. In this embodiment, the light source module 220 is a laser diode module, but not limited to that.

Concretely, referring to FIG. 4 again, the thermally assisted magnetic head slider 230 includes a leading edge 204, a trailing edge 205, an ABS 241 facing to the disk and processed so as to provide an appropriate flying height, an opposing surface 242 opposite the ABS 241, and a thermally assisted magnetic head 340 embedded in the trailing edge 205. The trailing edge 205 has multiple bonding pads 207, such as eight, to couple with a suspension 209 of the HGA 200. Specifically, the light source module 220 is mounted on the opposing surface 242.

FIG. 5 is a cross-section view of the thermally assisted magnetic head slider 230. Concretely, thermally assisted magnetic head 340 of the thermally assisted magnetic head slider 230 includes a magnetoresistive (MR) read portion 341 formed on the substrate 203 and a write portion 343 formed on the MR read portion 341. For example, the MR read portion 341 can be Current Perpendicular to Plane (CPP) sensor, Current In Plane (CIP) sensor, tunnel magnetoresistive (TMR) sensor, giant magnetoresistive (GMR) sensor, or anisotropic magnetoresistive (AMR) sensor and the like.

In this embodiment, the MR read portion 341 includes a first shielding layer 343 formed on the substrate 203, a second shielding layer 345, and a MR element 347 sandwiched between the first and second shielding layers 343, 345. And a pair of hard magnet layers (not shown) is sandwiched therebetween as well and respectively placed on two sides of the MR element 347. And the MR read portion 341 further includes a non-magnetic insulating layer (not shown) formed at one side of the MR element 347 far from the ABS 241 of the thermally assisted magnetic head slider 230.

Referring to FIG. 5, the write portion 342 includes a write element having a first magnetic pole 344, a second magnetic pole 346, coils 348 and a first gap layer 352 sandwiched between the first and second magnetic poles 344, 346, and the write portion 342 further includes a waveguide 354 formed adjacent to the first magnetic pole 344 for guiding light generated by the light source module 220, and a plasmon unit 356 sandwiched between the first magnetic pole 344 and the waveguide 354 for propagating near-field light to the ABS 241. Commonly, the first magnetic pole 344 is a main pole, and the second magnetic pole 346 is a return pole. The plasmon unit 356 can be a plasmon generator or a plasmonon antenna. Concretely, the plasmon unit 356 includes a near-field light generating surface 3561 facing to the ABS 241. The plasmon unit 356 is made of nonmagnetic materials including Au, Ag, Cu, Al, Ti, Ta or Ge element, or alloy thereof such as, which has high light absorption characteristic and low light refraction index, and its thickness is in a range of 10 nm-1000 nm.

During reading and writing operations, the thermally assisted magnetic head 340 aerodynamically flies above the surface of the rotating disks 301 with a predetermined flying height. Thus, the ends of the MR read portion 341 and the write portion 342 face the surface of the magnetic recording layer (not shown) of the magnetic disk 301 with an appropriate magnetic spacing. Then the MR read portion 341 reads data by sensing signal magnetic field from the magnetic recording layer, and the write portion 342 writes data by applying signal magnetic field to the magnetic recording layer. When writing data, signal current is conducted through the coils 348 and flux is induced into the first and second magnetic poles 344, 346, which causes flux to fringe across the pole tips at the ABS 241. This flux magnetizes circular tracks on the rotating disk 301 during a write operation. Meanwhile, laser light is generated from the light source module 220, for example the laser diode, and propagated through the waveguide 354 and guided to the plasmon unit 356. Then, the near-field light generating surface 3561 of the plasmon unit 356 will generate near-field light which may be propagated to the ABS 241. The generated near-field light reaches the surface of the magnetic disk 301, and heat a portion of the magnetic recording layer of the magnetic disk 301. As a result, the coercive force of the portion is decreased to a value that facilitates writing; thus the thermally assisted magnetic recording can be accomplished successfully.

Figure 6A:
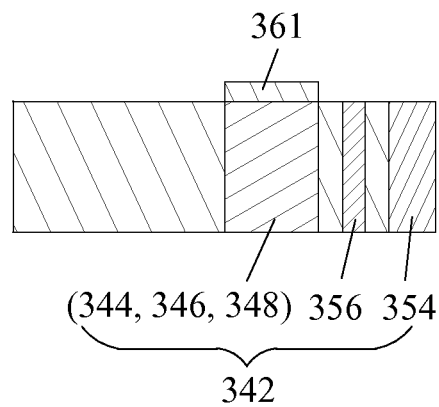
FIG. 6a is a simplified view of the write portion according to a first embodiment of the present invention.

Within the contemplation of the present invention, as shown in FIG. 6a, in the write portion 342, a first carbon layer 361 is covered on the write element. Specifically, the first carbon layer 361 with a predetermined thickness is covered on the opposed-to-magnetic recording medium surfaces of the first, second magnetic poles 344, 346 and the coils 348. Preferably, the first carbon layer 361 can be made by carbide or DLC material. While there is no carbon layer covered on surfaces of other elements such as the plasmon unit 356 and waveguide 354 in the write portion 342. Based on the arrangement of the write portion 342, on one hand, the first, second magnetic poles 344, 346 and the coils 348 are protected by the first carbon layer 361 from being corroded by oxygen due to the good oxygen barrier ability of the first carbon layer 361; one the other hand, the write element can be protected from being worn or abraded when accident touching or contacting with the medium, thereby keeping its reliability and a long using life. Furthermore, as there is no carbon layer on the plasmon unit 356 and waveguide 354, thus heat brought by the near-field light may not be absorbed and congregated on the surface during writing operation, so as to keep stable thermal ability for the plasmon unit 356.

Figure 6B:
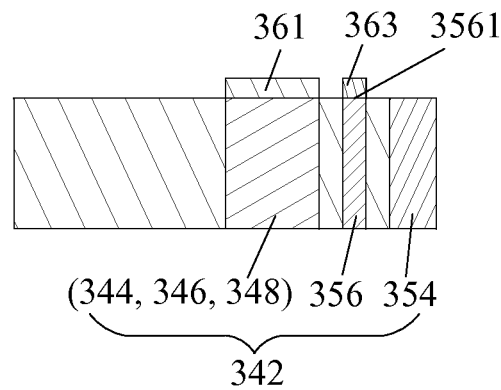
FIG. 6b is a simplified view of the write portion according to a second embodiment of the present invention.

As an improved embodiment of the write portion 342, as illustrated in FIG. 6b, a low light absorption layer 363 is formed on the near-field light generating surface 3561 of the plasmon unit 356, for protecting the plasmon unit 356. Concretely, the low light absorption layer 363 is made by material which is one or more selected from TaOx, SiOx, AlOx, WOx, BCxNy, AlNx, SiNx, AlOxNy, SiOxNy, TiOx, ZrOx, MgOx, ZrOxNy, YOx, NbOx, and GaNx, which may absorb less heat energy, thereby preventing the near-field light generating surface 3561 of the plasmon unit 356 from protruding over the ABS 241 to crash the magnetic recording medium during the thermally assisted writing operation.

Figure 6C:
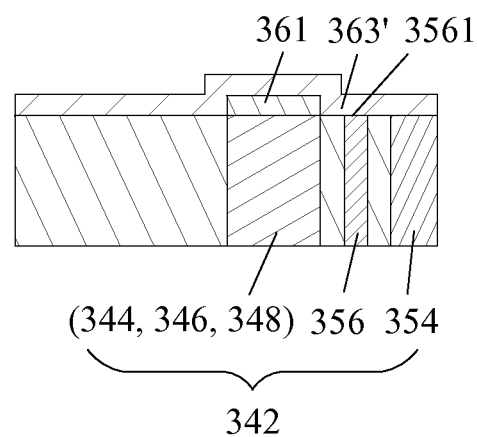
FIG. 6c is a simplified view of the write portion according to a third embodiment of the present invention.

Preferably, the low light absorption layer 363' is extended to cover the surface of the first carbon layer 361 and the opposed-to-magnetic recording medium surface of the waveguide 354, as shown in FIG. 6c.

Figure 7A:
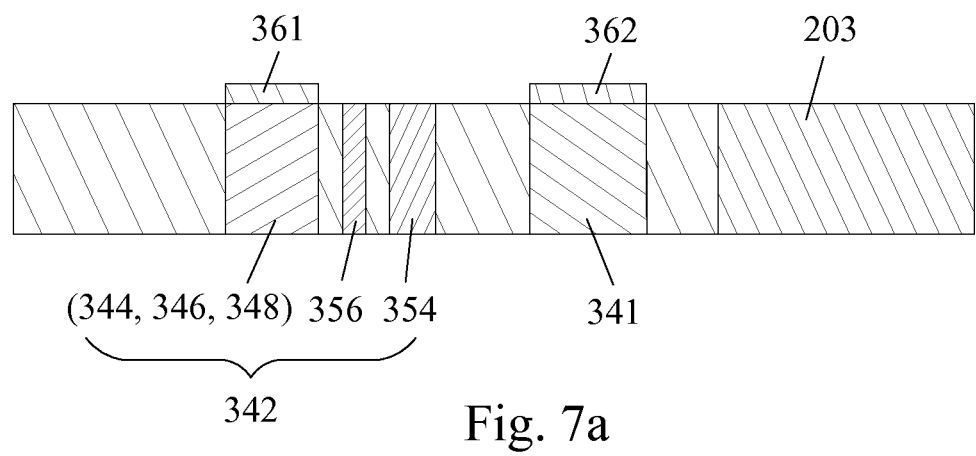
FIG. 7a is a simplified view of the thermally assisted magnetic head slider according to a first embodiment of the present invention.

As an improved embodiment of the thermally assisted magnetic head slider 230, a second carbon layer 362 is formed on the opposed-to-magnetic recording medium surface of the read portion 341 as shown in FIG. 7a, to prevent the read element 347 from being corroded by oxygen due to the good oxygen barrier ability of the second carbon layer 362.

Figure 7B:
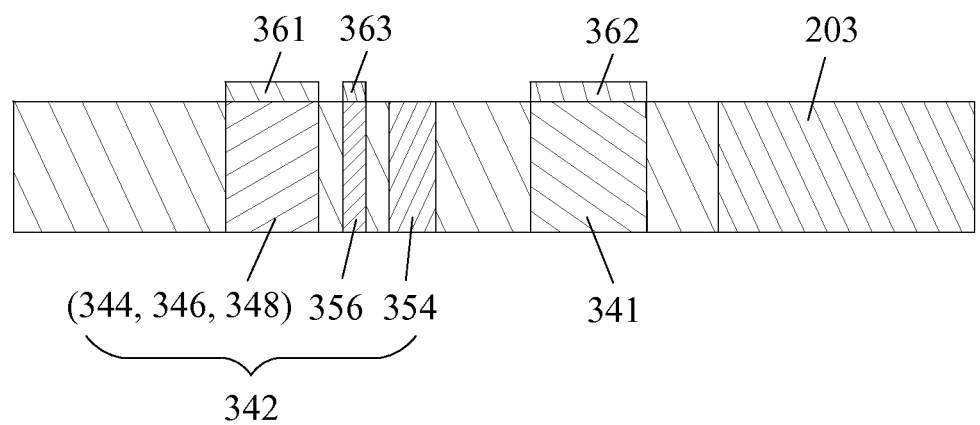
FIG. 7b is a simplified view of the thermally assisted magnetic head slider according to a second embodiment of the present invention.
Figure 7C:
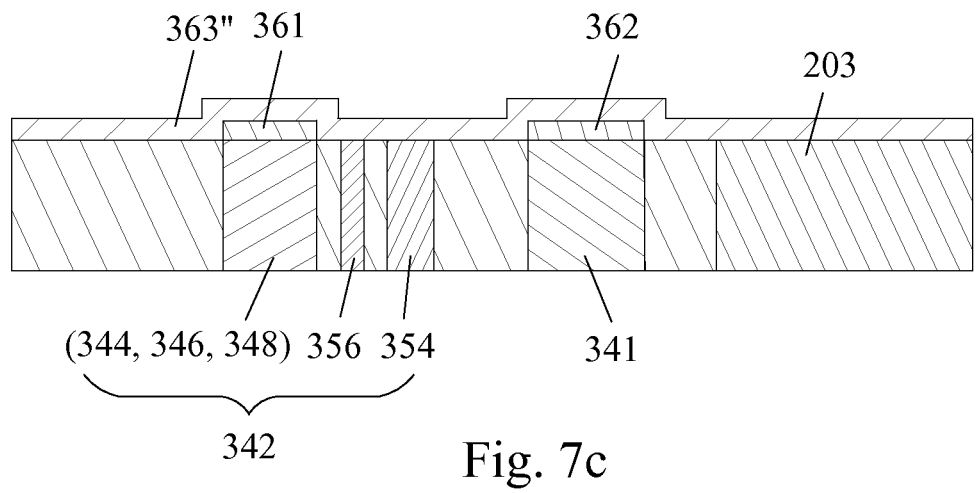
FIG. 7c is a simplified view of the thermally assisted magnetic head slider according to a third embodiment of the present invention.
Figure 7D:
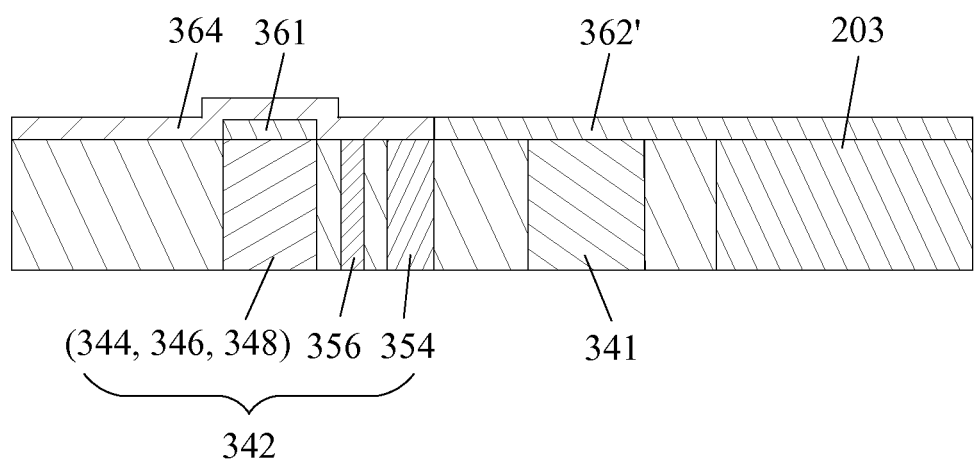
FIG. 7d is a simplified view of the thermally assisted magnetic head slider according to a fourth embodiment of the present invention.

Preferably, FIGS. 7b-7d show three variant embodiments of the thermally assisted magnetic head slider 230 based on the above mentioned embodiments. Differed from the embodiment shown in FIG. 7a, the second embodiment shown in FIG. 7b adds the low light absorption layer 363 formed on the near-field light generating surface 3561 of the plasmon unit 356, for protecting the plasmon unit 356. Differed from the second embodiment shown in FIG. 7b, the low light absorption layer 363" is extended to cover the surface of the first carbon layer 361, the opposed-to-magnetic recording medium surfaces of the waveguide 354 and the read portion 341, as illustrated in FIG. 7c. In the fourth embodiment shown in FIG. 7d, the second carbon layer 362' is covered on the whole read portion 341, and a low light absorption layer 364 is formed on the surface of the write portion 342 only.

Figure 8:
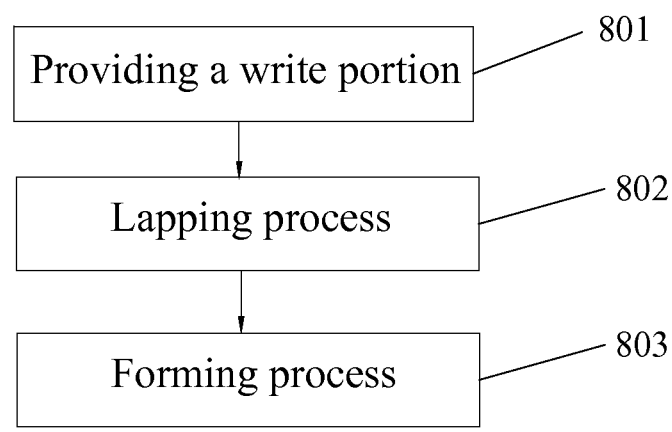
FIG. 8 is a simplified flowchart of a manufacturing method of a write portion according to one embodiment of the present invention.

FIG. 8 is a simplified flowchart of a manufacturing method of a write portion according to one embodiment of the present invention.

Step (801), providing a write portion including a write element, a waveguide, and a plasmon unit.

Step (802), lapping process—lapping opposed-to-magnetic recording medium surfaces of the write element and the waveguide, and a near-field light generating surface of the plasmon unit.

Step (803), forming process—forming a carbon layer on the opposed-to-magnetic recording medium surface of the write element.

Preferably, the method further includes forming a low light absorption layer on the near-field light generating surface and the opposed-to-magnetic recording medium surface of the waveguide. Preferably, the low light absorption layer can be covered on the carbon layer. More preferably, the carbon layer is formed by etching.

Figure 9:
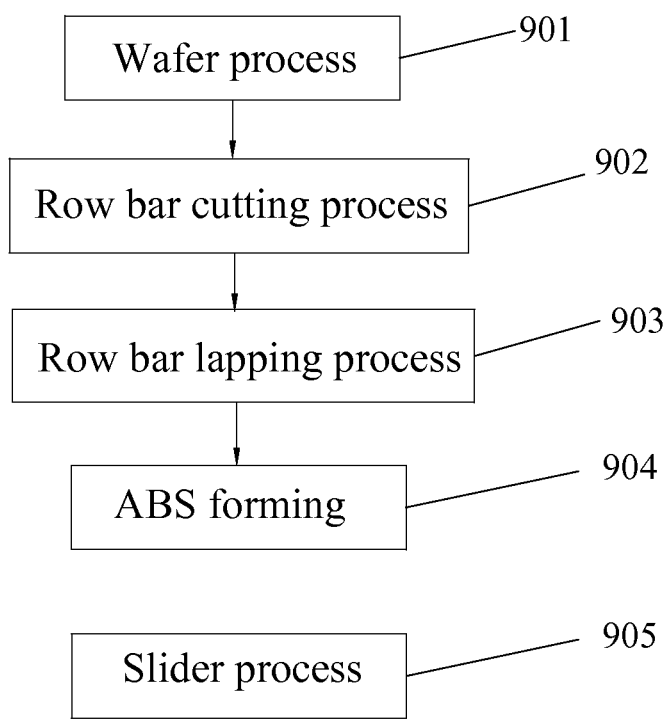
FIG. 9 is a simplified flowchart of a manufacturing method of a thermally assisted magnetic head slider according to one embodiment of the present invention.

FIG. 9 is a simplified flowchart of a manufacturing method of a thermally assisted magnetic head slider according to one embodiment of the present invention.

Step (901), wafer process. Concretely, the process includes providing a wafer with a plurality of thermally assisted magnetic head slider elements each of which has a substrate with an ABS facing to a magnetic recording medium surface, a read portion including a read element and a write portion including a write element, a waveguide, and a plasmon unit.

Step (902), row bar cutting process. In this process, the wafer is cut into a plurality of row bars with a row of thermally assisted magnetic head slider elements arranged.

Step (903), row bar lapping process. Concretely, surfaces of each row bar will be lapped in this process so as to obtain a predetermined requirement.

Step (904), ABS formation. Concretely, the process includes forming a first carbon layer on an opposed-to-magnetic recording medium surface of the write element.

Step (905), slider process. The row bar will be cut into a plurality of individual thermally assisted magnetic head slider; thereby the whole process is accomplished.

Preferably, the method further includes forming a second carbon layer on an opposed-to-magnetic recording medium surface of the read element, and the first and second carbon layers are formed by etching, such as dry etching or wet etching.

For example, a carbon layer with high energy is disposed on the opposed-to-magnetic recording medium surfaces of the thermally assisted magnetic head slider, then the portions of the carbon layer on the surface of the waveguide and the plasmon unit are removed by oxygen plasma such as reactive etching, finally the first carbon layer and the second carbon layer are remained on the corrosive elements, namely on the write element and the read element respectively. As an improved embodiment, a low light absorption layer is formed on the surfaces of the first and second carbon layers and the top surfaces of other elements of the thermally assisted magnetic head slider, so as to protect the near-field light generating surface of the plasmon unit and the opposed-to-magnetic recording medium surface of the waveguide.

In conclusion, compared with the prior art, the present invention aims at providing improved manufacturing method of a write portion and a thermally assisted magnetic head slider, thereby the corrosive elements in the write portion can be prevented from being worn and abraded, and stable thermal ability of the plasmon unit can be maintained.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A manufacturing method of a write portion for a thermal assisted magnetic head slider, comprising steps of:
   providing the write portion including a write element, a waveguide, and a plasmon unit;
   lapping opposed-to-magnetic recording medium surfaces of the write element and the waveguide, and a near-field light generating surface of the plasmon unit; and
   only forming a carbon layer on the opposed-to-magnetic recording medium surface of the write element.

2. The manufacturing method according to claim 1, further comprising forming a low light absorption layer on the near-field light generating surface of the plasmon unit and the opposed-to-magnetic recording medium surface of the waveguide.

3. The manufacturing method according to claim 1, further comprising forming a low light absorption layer on the carbon layer.

4. The manufacturing method according to claim 1, the carbon layer is formed by etching.

* * * * *